(12) United States Patent
Vanhelle et al.

(10) Patent No.: US 10,310,603 B2
(45) Date of Patent: Jun. 4, 2019

(54) CONTROL INTERFACE WITH HAPTIC FEEDBACK USING A MAGNETORHEOLOGICAL FLUID MODULE

(71) Applicant: DAV, Créteil (FR)

(72) Inventors: Stéphane Vanhelle, Créteil (FR); Jean-Marc Tissot, Creteil (FR)

(73) Assignee: DAV, Créteil (FR)

( * ) Notice: Subject to any disclaimer, the term of this patent is extended or adjusted under 35 U.S.C. 154(b) by 39 days.

(21) Appl. No.: 14/917,374

(22) PCT Filed: Sep. 8, 2014

(86) PCT No.: PCT/FR2014/000201
§ 371 (c)(1),
(2) Date: Mar. 8, 2016

(87) PCT Pub. No.: WO2015/033034
PCT Pub. Date: Mar. 12, 2015

(65) Prior Publication Data
US 2016/0216763 A1 Jul. 28, 2016

(30) Foreign Application Priority Data
Sep. 9, 2013 (FR) .................................... 13 02097

(51) Int. Cl.
*B60K 37/06* (2006.01)
*G06F 3/01* (2006.01)
(Continued)

(52) U.S. Cl.
CPC .............. *G06F 3/016* (2013.01); *B60K 37/06* (2013.01); *G05G 5/03* (2013.01); *G06F 3/0202* (2013.01);
(Continued)

(58) Field of Classification Search
CPC ........ G06F 3/016; G06F 3/017; G06F 3/0202; G06F 3/03547; G06F 3/0362; G06F 3/041; G06F 3/044; G06F 3/045
(Continued)

(56) References Cited

U.S. PATENT DOCUMENTS 5,359,307 A * 10/1994 Mahoney ........... H01H 51/2209
335/128
6,307,285 B1 10/2001 Delson et al.
(Continued)

FOREIGN PATENT DOCUMENTS

| DE | 10 2004 041 690 A1 | 3/2005 |
| FR | 2 930 654 A1 | 10/2009 |
| FR | 2 955 813 A1 | 8/2011 |

OTHER PUBLICATIONS

International Search Report issued in PCT/FR2014/000201 dated Jan. 12, 2014 (6 pages).
(Continued)

*Primary Examiner* — Alexander Eisen
*Assistant Examiner* — Nelson Lam
(74) *Attorney, Agent, or Firm* — Osha Liang LLP (57) ABSTRACT

The invention relates to a control interface with haptic feedback (1), especially for a motor vehicle, designed to take into account an action of a user by providing the user with a haptic feedback, comprising a magnetorheological fluid module (5), said module comprising:
- an element (7) which rotates about an axis (Z) of the module (5), said rotary element (7) being in contact with the magnetorheological fluid and designed to be coupled to a grip element (3),
- a unit (9) for applying a magnetic field to the magnetorheological fluid, designed to modify the strength of the magnetic field, (Continued)

wherein said interface (1) comprises a processing unit (10) designed to receive a signal emitted by an environmental sensor (25, 26, 27, 29) and to control the unit (9) for applying a magnetic field according to the signal received.

18 Claims, 6 Drawing Sheets

(51) Int. Cl.
*G06F 3/0362* (2013.01)
*G05G 5/03* (2008.04)
*G06F 3/02* (2006.01)
*G06F 3/038* (2013.01)
*G05G 1/08* (2006.01)
*H01H 3/08* (2006.01)
*H01H 3/00* (2006.01)

(52) U.S. Cl.
CPC .......... *G06F 3/0362* (2013.01); *G06F 3/0383* (2013.01); *B60K 2350/102* (2013.01); *B60K 2350/1012* (2013.01); *G05G 1/08* (2013.01); *H01H 3/08* (2013.01); *H01H 2003/008* (2013.01)

(58) Field of Classification Search
USPC .......................................... 345/184, 156–179
See application file for complete search history.

(56) References Cited

U.S. PATENT DOCUMENTS

| | | | | |
|---|---|---|---|---|
| 8,797,153 | B2* | 8/2014 | Vanhelle | B60K 37/06 |
| | | | | 200/4 |
| 9,489,810 | B2* | 11/2016 | Tissot | G05G 5/06 |
| 9,690,412 | B2* | 6/2017 | Tissot | B60K 37/06 |
| 9,898,032 | B2* | 2/2018 | Hafez | G06F 3/0362 |
| 10,146,309 | B2* | 12/2018 | Tissot | B60K 37/06 |
| 2002/0057152 | A1* | 5/2002 | Elferich | G05G 1/08 |
| | | | | 335/220 |
| 2004/0100440 | A1 | 5/2004 | Levin et al. | |
| 2005/0156892 | A1* | 7/2005 | Grant | G06F 3/016 |
| | | | | 345/167 |
| 2006/0012584 | A1 | 1/2006 | Vassallo et al. | |
| 2006/0033703 | A1* | 2/2006 | Olien | G06F 3/0362 |
| | | | | 345/156 |
| 2006/0274033 | A1* | 12/2006 | Ruettiger | H01H 19/11 |
| | | | | 345/156 |
| 2007/0013655 | A1 | 1/2007 | Rosenberg et al. | |
| 2007/0018790 | A1* | 1/2007 | LaFrance | B60R 25/10 |
| | | | | 340/5.72 |
| 2007/0273671 | A1* | 11/2007 | Zadesky | G06F 3/0338 |
| | | | | 345/173 |
| 2007/0279401 | A1* | 12/2007 | Ramstein | G06F 3/016 |
| | | | | 345/184 |
| 2008/0116896 | A1* | 5/2008 | Skinner | B60T 17/22 |
| | | | | 324/418 |
| 2009/0189747 | A1 | 7/2009 | Baier et al. | |
| 2010/0283588 | A1* | 11/2010 | Gomez | G06F 3/016 |
| | | | | 340/407.2 |
| 2012/0249315 | A1* | 10/2012 | Vanhelle | B60K 37/06 |
| | | | | 340/425.5 |
| 2012/0326967 | A1* | 12/2012 | Gohng | B60K 35/00 |
| | | | | 345/156 |
| 2013/0199344 | A1* | 8/2013 | Lee | B25B 23/1425 |
| | | | | 81/467 |
| 2015/0009168 | A1* | 1/2015 | Levesque | H04M 19/04 |
| | | | | 345/174 |
| 2016/0209863 | A1* | 7/2016 | Stringos | G05G 1/10 |
| 2016/0216762 | A1* | 7/2016 | Vanhelle | B60K 37/06 |
| 2016/0216763 | A1* | 7/2016 | Vanhelle | G06F 3/0362 |
| 2016/0224114 | A1* | 8/2016 | Vanhelle | B60K 37/06 |
| 2016/0378131 | A1* | 12/2016 | Battlogg | G05G 5/03 |
| | | | | 74/553 |
| 2017/0227980 | A1* | 8/2017 | Hafez | G06F 3/0362 |
| 2018/0229704 | A1* | 8/2018 | Eck | G06F 3/016 |
| 2018/0231093 | A1* | 8/2018 | Hafez | F16F 9/535 |

OTHER PUBLICATIONS

Written Opinion of the International Searching Authority issued in PCT/FR2014/000201 dated Jan. 12, 2014 (6 pages).

* cited by examiner

CONTROL INTERFACE WITH HAPTIC FEEDBACK USING A MAGNETORHEOLOGICAL FLUID MODULE

The present invention relates to a control interface and especially a rotary control interface or knob, in particular for a motor vehicle, enabling haptic feedback to be transmitted to a user, such as a force of variable resistance.

Haptic feedback, on knobs for example, is comprised of resistance forces of variable values, creating hard points and levels which correspond to different commands for the devices controlled via the interface in question. Haptic feedback is advantageous while driving as it requires little attention from the driver; in particular, it does not require the driver to look away from the road.

However, a control interface with a defined haptic feedback pattern, such as mechanical haptic feedback means for example, can only be suitable for a limited number of functions to be controlled. These functions must have the same number of possible controls, equal to the number of hard points, for example, on a complete range of a grip element. The number of control elements must be multiplied in order to obtain various haptic feedback patterns.

In addition, the haptic feedback provided for the mechanical means is always the same and cannot be adapted according to environmental parameters.

In order to at least partially overcome these aforementioned defects and make it possible to achieve a reconfigurable haptic feedback interface, especially according to an environmental parameter, the subject of the invention is a haptic feedback control interface, especially for a motor vehicle, designed to take into account an action of a user by providing the user with a haptic feedback, comprising a magnetorheological fluid module, said module comprising:
- an element which rotates about an axis of the module, said rotary element being in contact with the magnetorheological fluid and designed to be coupled to a grip element,
- a unit for applying a magnetic field to the magnetorheological fluid, designed to modify the strength of the magnetic field, wherein said interface comprises a processing unit configured to receive a signal emitted by an environmental sensor and to control the application unit based on the signal received.

Such an interface makes it possible to obtain haptic feedback that is variable through reconfiguration according to the environmental parameter.

According to another aspect of the present invention, the environmental sensor is a user approach sensor at the grip element.

According to an additional aspect of the present invention, the approach sensor is a contact sensor configured to detect the users touch on the grip element.

According to a further aspect of the present invention, the contact sensor is a resistive sensor.

According to another aspect of the present invention, the contact sensor is a capacitive sensor.

According to an additional aspect of the present invention, the contact sensor is an optical sensor.

According to a further aspect of the present invention, the control of the unit for applying a magnetic field corresponds to an absence of application of a magnetic field when the user does not touch the grip element and to the application of a magnetic field when the user touches the grip element.

The absence of application of a magnetic field, when no contact is detected, enables the overall power consumption to be reduced.

According to another aspect of the present invention, the approach sensor is a contactless sensor.

The use of a contactless sensor enables the application unit to be supplied a magnetic field before the user touches the grip element, thereby avoiding the presence of a module reaction time in order to apply haptic feedback the moment when the user touches the module.

According to an additional aspect of the present invention, the contactless sensor is a capacitive sensor.

According to a further aspect of the present invention, the contactless sensor is an optical sensor.

According to another aspect of the present invention, the control of the unit for applying a magnetic field corresponds to an absence of application of a magnetic field when the user is not detected by the contactless approach sensor and the application of a magnetic field when the user is detected by the contactless approach sensor.

The absence of application of a magnetic field, when no presence is detected, enables the power consumption to be reduced.

According to an additional aspect of the present invention, the environmental sensor is a torque sensor. This sensor can, for example, supply a signal such as an output voltage, representative of the activation force of a rotary element. Of course, such a signal of the force gives the activation direction of the rotary element at the same time. The output signal of the sensor can thus be used to determine the direction of the force and therefore the activation direction of the rotary element.

The force sensor can be used to trigger the supply of the application unit and/or to determine the haptic feedback pattern to be applied according to the direction of rotation of the user.

According to a further aspect of the present invention, the environmental sensor is configured to detect a parameter of the vehicle.

According to another aspect of the present invention, the control of the unit for applying a magnetic field corresponds to the application of a haptic feedback pattern that is predefined according to a value or a state of the vehicle's parameter.

The resistance or the spacing of the hard points of the haptic feedback can thus be modified according to parameters such as the speed of the vehicle or a configuration of the vehicle.

According to a further aspect of the present invention, the control interface also comprises the environmental sensor.

The presence of the environmental sensor at the control interface and especially at the grip element of the module provides a compact and easy-to-install interface.

According to another further aspect of the present invention, the control interface also comprises a position encoder configured to supply a signal representative of the angular position of the rotary element.

According to an additional aspect of the present invention, the unit for applying a magnetic field to the magnetorheological fluid is configured to modify the strength of the magnetic field applied to the magnetorheological fluid according to the rotation of the rotary element about the axis of the module.

Further features and advantages of the invention will become more clearly apparent from reading the following description, given by way of example and in no way limiting, in reference to the appended drawings.

The same elements bear the same reference numbers in all the figures.

Figure 1:
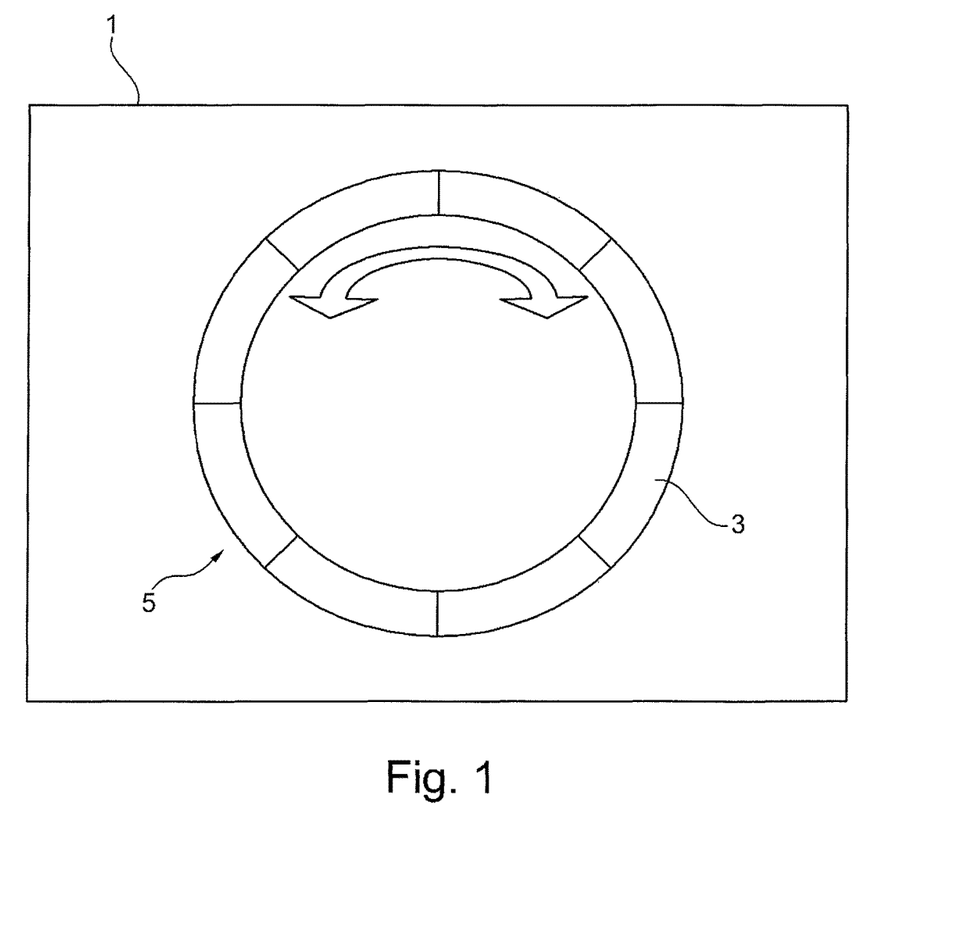
FIG. 1 shows a front view of a magnetorheological fluid module according to the present invention.

The invention relates to a control interface with haptic feedback 1, as shown in FIG. 1, for example for a dashboard of a motor vehicle, or for a central console of a motor vehicle, for controlling systems on board the vehicle. The control interface 1 comprises a magnetorheological fluid module 5 able to transmit haptic feedback to a user in the form of a resistance force applied to a grip element 3. In addition, this module 5 is associated with an environmental sensor enabling the module 5 to be controlled.

Figure 2:
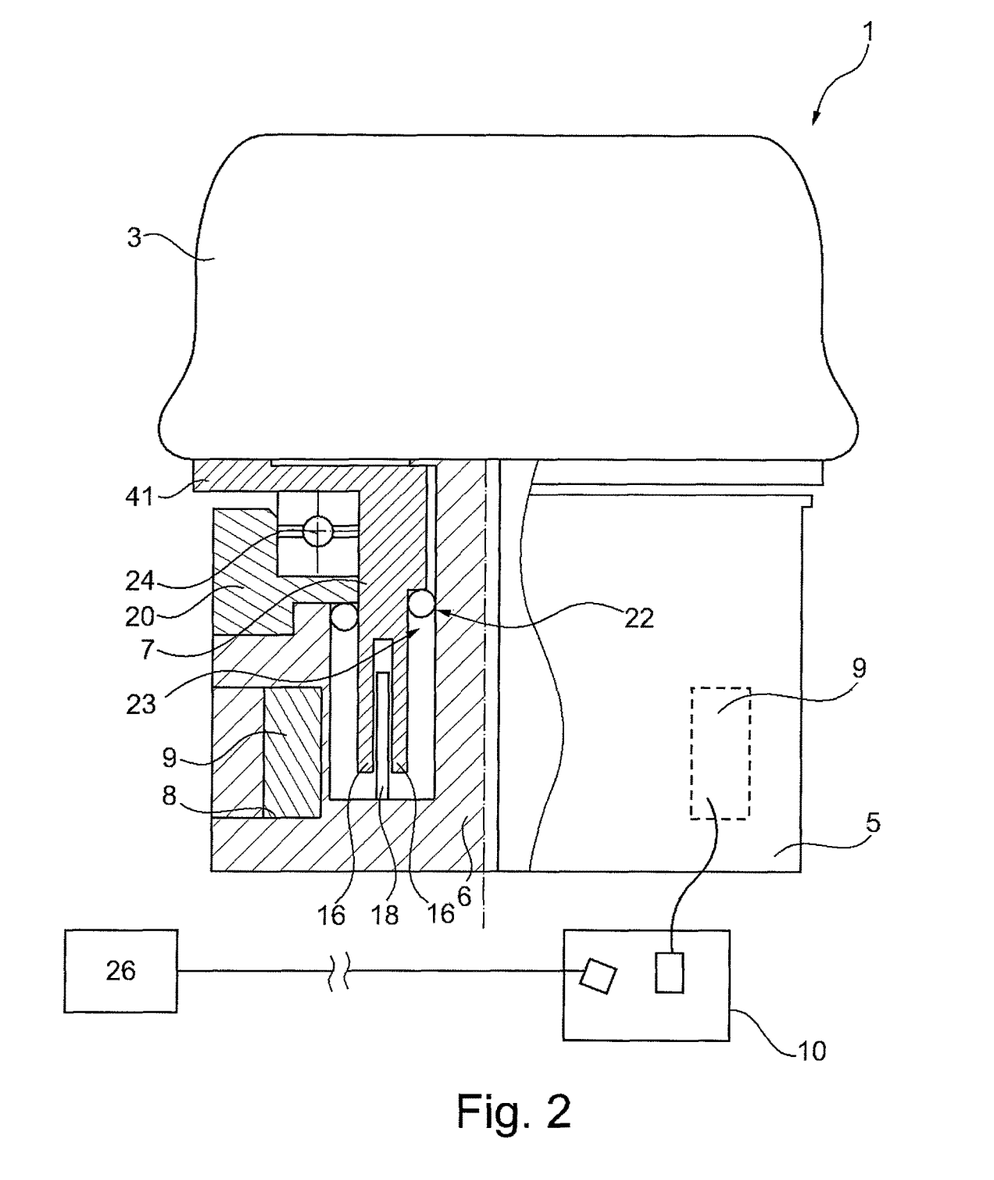
FIG. 2 shows a sectional view of a magnetorheological fluid module associated with a proximity sensor according to the present invention.

FIG. 2 shows an example of a magnetorheological fluid module 5 that is cylindrical in shape along the Z axis of module 5. The module 5 comprises a generally cylindrical structure and closed at one of its ends which comprises a fixed central axis 6 oriented along the Z axis around which is mounted the rotatable element 7 and a cavity 23 designed to receive the magnetorheological fluid on the one hand, and one extremity of the rotary element 7 on the other hand. The rotary element 7 is thus partially immersed in the magnetorheological fluid. The structure also includes a circular recess 8 that at least partially surrounds the cavity 23. The circular recess 8 is designed to receive one or several coils which, with its power supply(s) (not shown), form(s) a unit 9 for applying a magnetic field on the magnetorheological fluid.

The magnetic field created by a coil is proportional to the current flowing through it such that by varying the supply to the coil, one can vary the strength of the magnetic field applied to the magnetorheological fluid, which allows the viscosity of the fluid to be varied.

Furthermore, the frictional force applied by the magnetorheological fluid on the rotary element 7 varies according to the surface area of fluid in contact with the mobile element 7. Thus, the rotary element 7 may comprise a plurality of walls 16 which are opposite the walls of the cavity 23. The cavity 23 may especially comprise a central wall 18 which is arranged between the walls 16 of the rotary element 7 to increase the opposing surface area between the rotary element 7 and the fixed walls 16, 18 of the cavity 23 and thus increase the force couple that can be exerted on the rotary element 7 with a given power supply.

On the other hand, in the embodiment of FIG. 2, the cavity 23 is closed by a cover 20 that compresses a seal 22 ensuring a hermetic seal so as to prevent any leakage of magnetorheological fluid. The cover 20 also comprises a housing to accommodate a bearing or ball bearing 24 which ensures the connection with the rotary element 7 and its rotational movement.

Furthermore, in the example shown in FIG. 2, the grip element 3 is integral, i.e. rigidly connected to the rotary element 7. The rotary element 7 has an output shaft 41 which connects the module 5 to the grip element 3. The grip element 3 is, for example, integral with the rotary element 7 or clipped onto the rotary element 7 or secured by a pin or by any fastening means known in the prior art.

Alternatively, the grip element 3 can be coupled to the rotary element 7 via a system of gears, chains, belts or any other mechanical means of ensuring a rotational coupling between the grip element 3 and the rotary element 7. A system of gears especially serves to create a gear reduction between the rotation of the grip element 3 and the rotary element 7 to allow for more precise rotation control.

In addition, the module 5 is associated with an environmental sensor 26, whose signal is used to control the unit 9 applying a magnetic field of the module 5.

The various embodiments of the environmental sensor 26 and the various associated control modes will be described in detail in the rest of the description. The module 5 also comprises a processing unit 10 connected, on the one hand, to the environmental sensor 26 and, on the other hand, to the unit 9 for applying a magnetic field and configured to control the application unit 9 according to a signal from the proximity sensor 26.

Figure 3:
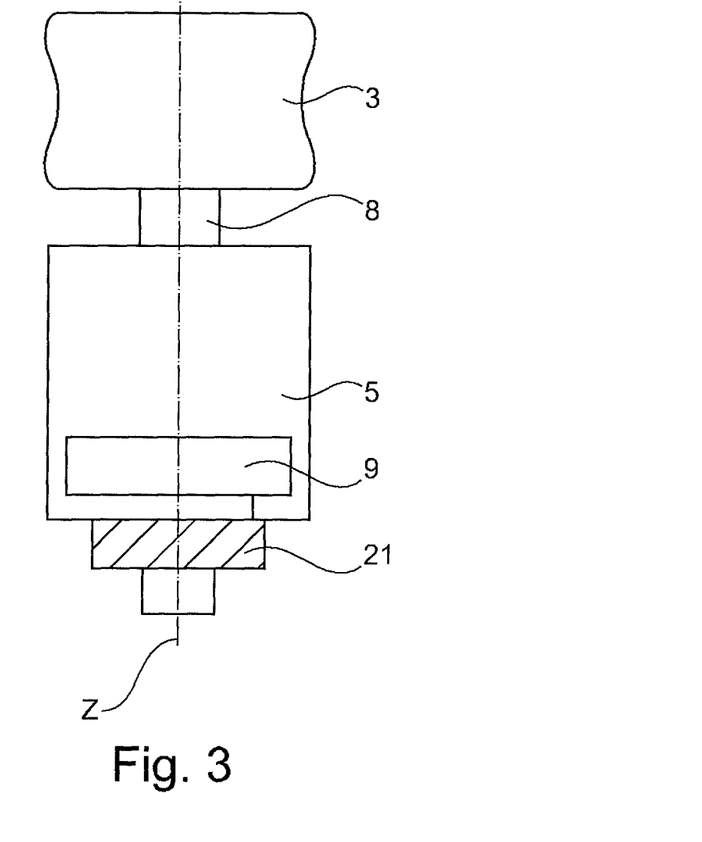
FIG. 3 shows a magnetorheological fluid module comprising a position encoder of the rotary element of the module.

As shown in FIG. 3, the magnetorheological fluid module 5 also comprises a sensor or position encoder 21 of the rotary element 7 that allows one to know the angular position of the rotary element 7 about the Z axis so as to apply a haptic feedback via the application unit 9 according to the angular position of the rotary element 7. The position encoder 21 can, for example, comprise a set of contacts and a brush, successively in contact with certain of said contacts when the element 7 is rotated. Alternatively, the position encoder 21 can be an optical encoder comprising one or more optical forks or a piezoelectric device or any other position sensor known to those skilled in the art. The position encoder 21 can be arranged at different locations near the rotary element 7 and especially next to the grip element 3. Furthermore, alternatively, the position encoder 21 can also be configured to determine the absolute angular position of the grip element 3 in relation to the reference position. The position encoder 21 can be connected directly to the application unit 9 as shown in FIG. 3 or via the processing unit 10 described in FIG. 2.

The unit 9 for applying a magnetic field to the magnetorheological fluid represented in FIGS. 2 and 3 is connected to the position encoder 21 and is configured to produce the desired haptic feedback according to the signal provided. This application unit 9 is configured to detect a predetermined position of the grip element 3, for example a certain number of indexing positions, and to modify the strength of the magnetic field when an indexing position is reached. Alternatively, the encoder signal is processed by the processing unit 10 that controls the application unit 9 to obtain the desired haptic feedback.

Different haptic feedback shapes or profiles can be obtained depending on the configuration of the application unit 9. For example, the strength of the magnetic field can have a square shape in which the strength is zero or weak except at the indexing positions where this strength is strong so as to create a significant friction force at the passage of indexing points. The viscosity of the magnetorheological fluid varies under the effect of a variable magnetic field such that the friction force induced by the magnetorheological fluid is low when the magnetic field is not applied and becomes increasingly stronger when the strength of the magnetic field increases. Thus, the application of a square-shaped intensity enables hard points to be created at the indexing points for which the intensity is high.

Depending on the position, other resistance force profiles or patterns are also possible, such as triangular or sawtooth profiles for example distributed around indexing positions, such that they are perceived as a progressive hard point to overcome, once to reach it, and once to move away or simply to reach it.

The application unit 9 can be reconfigured almost instantly by applying a different profile which allows, in particular, the position and/or the number of hard spots to be varied. Thus, the module 5 can be used for several different functions, with different indexing position numbers and different haptic feedback profiles.

Resistance forces can also be used to improve the accuracy of the displacement of the grip element 3. For example, if a precise position in a range of positions must be reached, the resistance force can be decreased or increased depending on the rotational speed of the grip element 3, for example when scrolling through a list by reducing the resistance when the rotation of the grip element 3 is rapid and by increasing the resistance when approaching the end of the list or when one slows the speed of rotation. A very strong force can also be produced by supplying the coil with a strong current to simulate a stop, for example at the start or at the end of a list. The resistance of the haptic feedback can also be adjusted by the user if he wishes a more or less pronounced haptic feedback, for example by adjusting a resistance parameter in a settings menu.

Such a magnetorheological fluid module 5 thus allows a rotation control module to be obtained via a rotary button or knob corresponding to the grip element 3 that is reconfigurable, compact and easy to power.

Furthermore, the magnetorheological fluid module 5 is coupled to an environmental sensor so as to control the application unit 9 based on the signal provided by the environmental sensor 26.

According to a first embodiment, the environmental sensor 26 is a proximity sensor or an approach sensor configured to detect the approach or the touch of a user on the grip element 3 and the control of the application unit 9 corresponds for example to the application of a magnetic field by the application unit 9 when the user touches or approaches the grip element 3, no magnetic field being applied when the user is not detected by the approach sensor 26. The proximity sensor is either a contact sensor configured to detect a contact between the user and the grip element 3, or a contactless contact configured to detect a user when he is present in a predetermined zone around the grip element 3, for example when he is within a perimeter of a few centimeters, or a combination of the two, the approach sensor being able to simultaneously detect the presence of the user when he is within a predefined area around the grip member 3 and when he touches the grip element 3. In this case, two different configurations of the application unit 9 of a magnetic field can be provided, for example a standby configuration with reduced power when the user is in a peripheral area and a normal supply configuration when the user touches the grip element 3.

Figure 5:
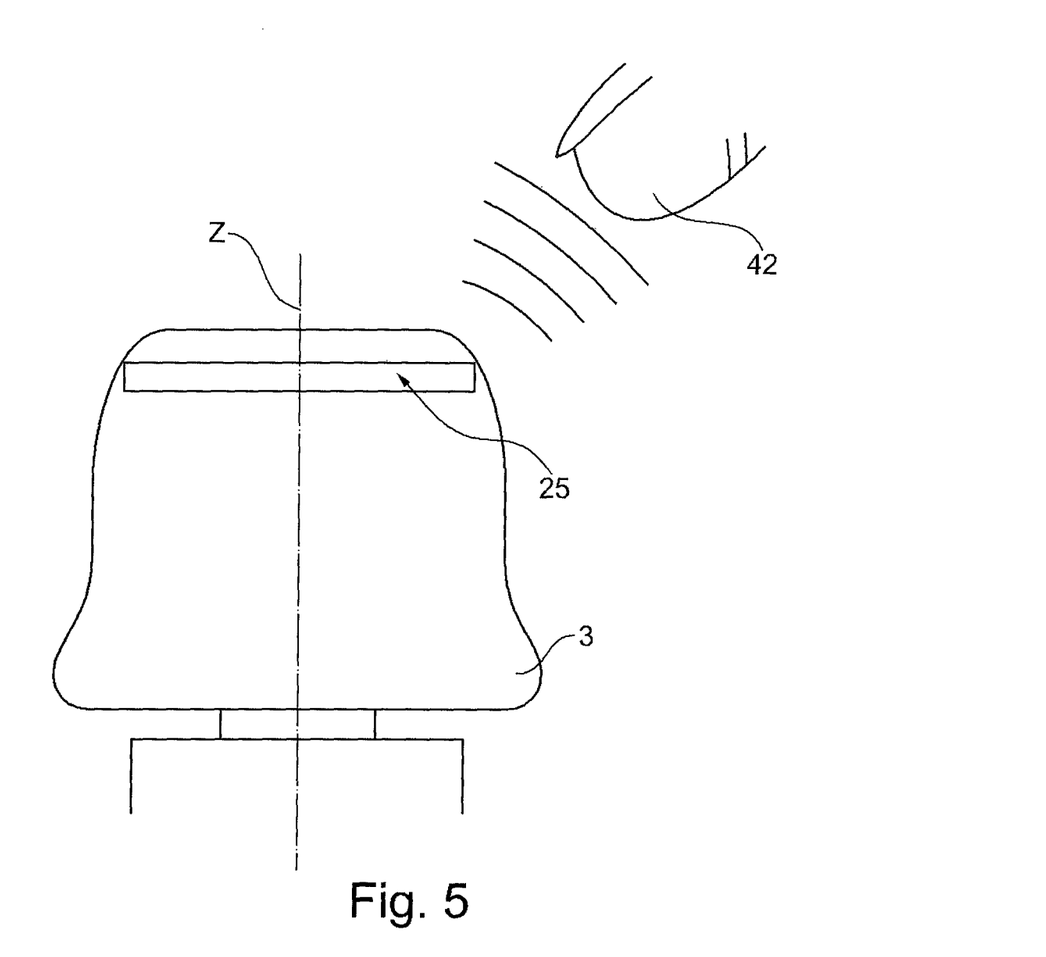
FIG. 5 shows a magnetorheological module associated with a proximity sensor housed in a grip element.

The approach sensor is, for example, a capacitive sensor 25 disposed at the grip element 3 as shown in FIG. 5. Depending on its configuration, the capacitive sensor 25 can detect the user and more particularly, his finger 42, when the latter touches the grip element 3 and/or when it is near the grip element 3, for example a few millimeters or centimeters from the grip element 3. The capacitive sensor 25 can thus be a contact sensor and/or a contactless sensor depending on the configuration.

The proximity sensor 26 can also be a resistive sensor disposed at the grip member 3 which enables the touch of the user on the grip element 3 to be detected. In this case, the proximity sensor is only a contact sensor.

Figure 6:
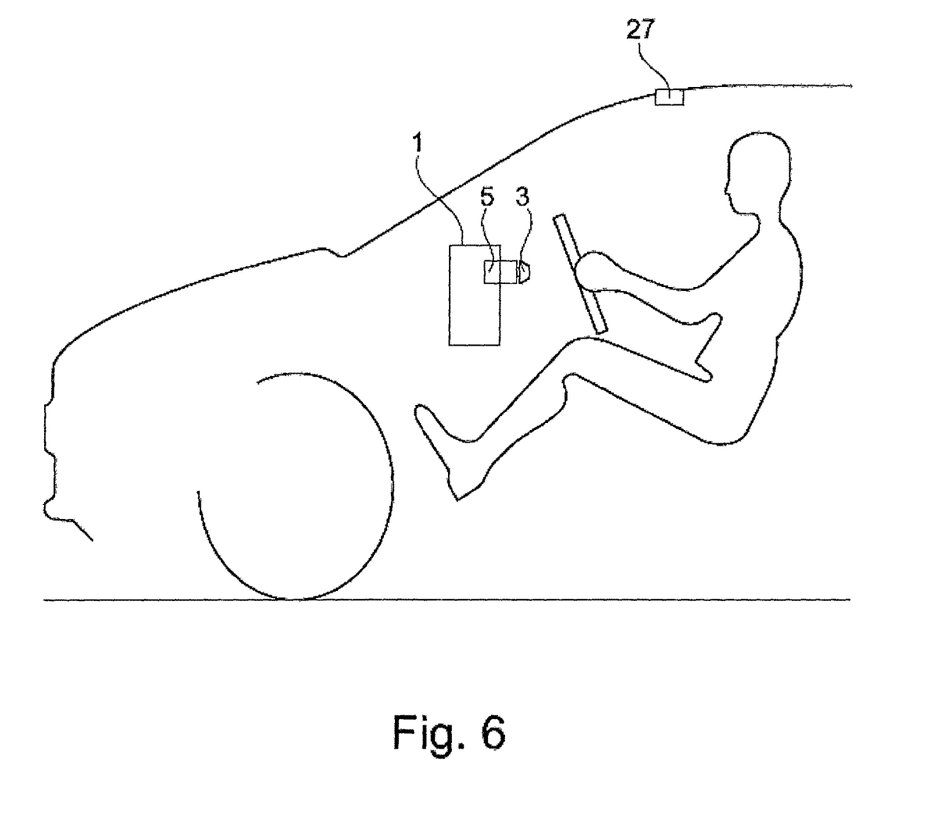
FIG. 6 shows a vehicle comprising a control interface according to the present invention comprising a magnetorheological fluid associated with an optical proximity sensor.

According to a second embodiment, the proximity sensor 26 is an optical sensor 27, for example an infra-red sensor disposed at the grip element 3 and enabling the detection of the approach detector and/or the touch of the user or an optical sensor 27 such as a camera, as shown in FIG. 6, whose field comprises the grip element 3. In this case, the camera is arranged on the ceiling of a motor vehicle and is oriented toward the central console comprising the control interface 1 with the magnetorheological fluid module 5. The camera is coupled to a processing unit comprising image analysis software to detect the approach of the user's hand toward the grip element 3 and/or his touch. When the approach of the user is detected, a signal is sent to supply the application unit 9. Another signal may be transmitted when the user touches the grip element 3. The optical sensor can thus be a contact sensor and/or a contactless sensor.

The approach sensor, whether it is optical, capacitive or resistive, can also be used to stop the supply of the application unit 9, for example, when the user is no longer detected by the approach or contact sensor when the user is a sufficient distance from the grip element 3. However, in order to avoid excessive power supply changes, a timer can be coupled to the approach sensor so as to wait a certain period once the approach sensor no longer detects the user (or is arranged at a distance beyond a threshold distance from the grip element 3) in order to stop the power of the application unit 9. In addition, different power levels can be set, the power level of the application unit 9 is then adjusted based on the signal provided by the approach sensor and/or the timer.

It is obvious that the position encoder 21 and other equipment associated with the magnetorheological fluid module 5 can be activated or deactivated in response to signals supplied by the approach sensor.

Figure 4:
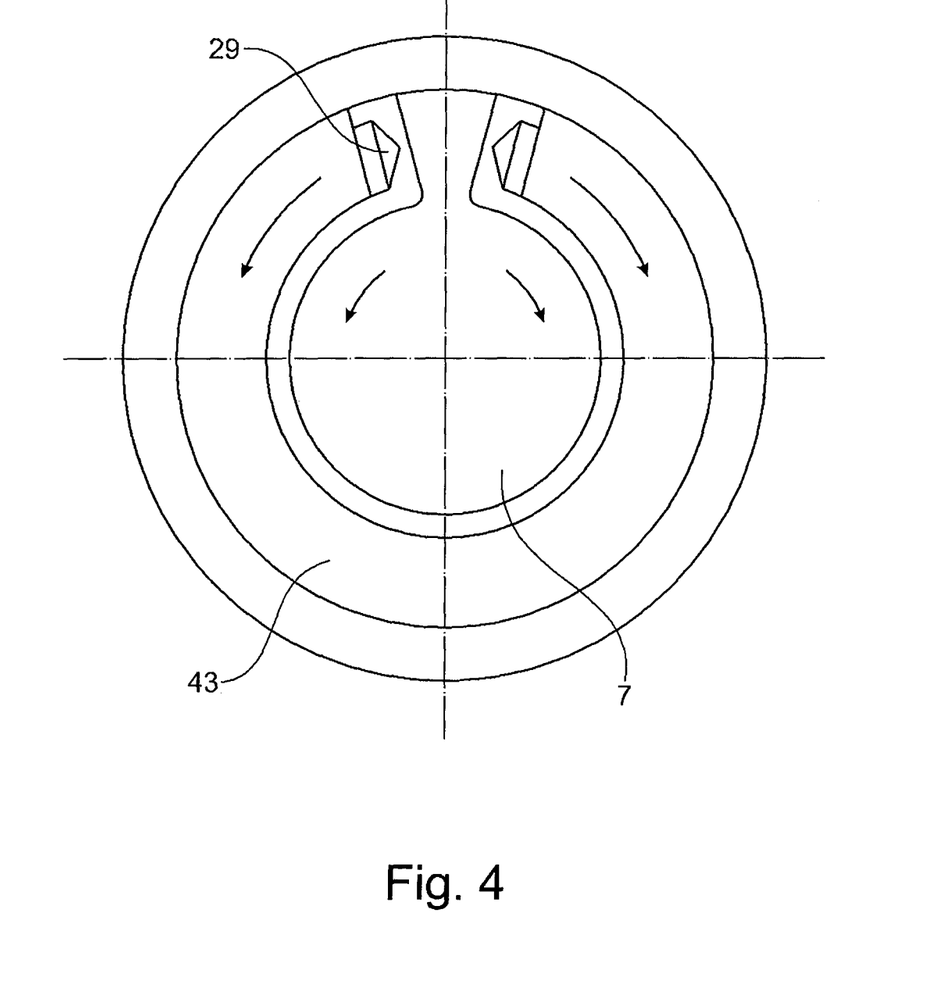
FIG. 4 shows a torque sensor installed on the magnetorheological fluid module.

According to a third embodiment, the environment sensor 26 is a torque sensor 29 as represented in FIG. 4. The torque sensor 29 is used to almost instantly determine the direction of rotation of the grip element 3 generated by the user and thus allows one to configure the haptic feedback and the control as soon as the user begins to exert a force on the grip element 3. The responsiveness is much faster than for the position encoder 21 where the rotation must reach the next increment of said encoder 21 to determine the direction of rotation.

To do this, the torque sensor 29 can, for example, supply a signal, such as an output voltage, representative of an activation force of the rotary element 7. Of course, the signal of the force also gives a direction of rotation and thus activation of the rotary element 7 at the same time. The output signal of the sensor 29 can thus be used to determine the direction of the force and therefore the activation direction of the rotary element 7.

The responsiveness or rapid response of a torque sensor 29 is, for example, useful in preventing a "sticking effect" of the grip element 3. This "sticking effect" can occur when an end of travel stop of the grip element 3 is programmed at a predetermined angle. In this case, when it is turned in one direction of rotation, the user can, for example, freely turn the grip element 3 until the encoder 21 detects that the predetermined rotation angle is reached. At this moment, the application unit 9 is ordered to apply a magnetic field, and the user feels a stop. If the user immediately reverses the direction of rotation to move away from the stop, the torque sensor 29, owing to its responsiveness, immediately detects the change in rotation direction and stops the application of the magnetic field so that the user no longer feels "stuck in the programmed stop".

In the embodiment of FIG. 4, the grip element 3 (only partly represented here) is mounted in a pivoting manner in relation to a ring 43 of the rotary element 7, the pivoting of the grip element 3 being blocked by two torque sensors 29 arranged between the grip element 3 and the ring 43 of the rotary element 7.

Alternatively, a single torque sensor 29 can be used, for example by applying a stress to the sensor, the rotation of the grip element 3 in a direction causing a detectable under-stress while rotation in the other direction causes an equally detectable over-stress.

The technology used for the at least one torque sensor 29, can be piezo-resistive, capacitive resistive or any other technology known to those skilled in the art to detect a torque variation, such as strain gauges, etc. for example. The torque sensor 29 is thus configured to supply a representative signal of the direction and/or an activation force of the rotary element 7, this signal being supplied to the application unit 9 to apply the desired haptic feedback. The signal of the torque sensor 29 can also be used to trigger the supply of the module 5 and especially the application unit 9 of the magnetic field.

Furthermore, in the case where the torque sensor 29 is, for example, a strain gauge as mentioned above, to measure a direction or a force, it deforms in an elastic manner. This property can also be beneficial in the case where one wants to prevent the "sticking" effect described above. After having reached the stop programmed at a predetermined angle, when the direction of rotation is immediately reversed, the elasticity of the strain gauge allows for a slight relative movement of the grip element 3, especially in the reverse direction, even before the magnetic field has been stopped, which further contributes to the elimination of a potential sticking effect.

According to a fourth embodiment, the environmental sensor is configured to detect a parameter of the vehicle such as, for example, the speed of the vehicle, the start of the windshield wipers, the lights being turned on or a configuration of the vehicle such as a sport, economic or comfort mode. The unit 9 for applying a magnetic field is thus controlled to adapt the strength of the magnetic field applied. Thus, the hardness and spacing of the indexing points can be modified according to the signal received from the environmental sensor. For example, the indexing point can be further apart and more difficult to pass when the speed of the vehicle increases or when the user switches to sport mode. Conversely, the applied magnetic field can be less in an economic mode, when the vehicle is stationary or when the headlights are off.

In addition, the various environmental sensors described above can be combined, the unit 9 for applying a magnetic field then being controlled based on the signals emitted by the various environmental sensors 26. Thus, an approach sensor can be used to trigger the supply of the application unit 9 while a speed sensor of the vehicle is used to modulate the strength of the electric field applied at the indexing points. Furthermore, the various indexing patterns can be stored in a memory or database arranged for example in the processing unit 10.

To better understand the invention, an operating example will now be described based on the optical proximity sensor 27 corresponding to a camera described in FIG. 6 and a torque sensor 29 represented in FIG. 4.

The camera and the associated processing unit 10 allow for an approach of the user's hand toward the grip element 3 to be detected and at a distance less than a given threshold, for example 2 or 3 cm, corresponding to a detection area. So as long as the user's arm is not within the detection area, the application unit 9 is not energized. When the user's hand is detected in the detection area, a signal is sent by the processing unit 10 so as to power the application unit 9 which then supplies the coil so as to generate the haptic feedback corresponding to the position of the grip element 3. The user's hand then comes into contact with the grip element 3 and exerts a force on said grip element 3. This force is detected by the torque sensor 29 which also detects the direction in which the force is exerted, for example in a clockwise direction. A signal is then sent from the torque sensor 29 to the application unit 9 via the processing unit 10 to adapt the haptic feedback profile to be applied.

When the user removes his hand from the detection area, the camera detects this absence and a five second timer is triggered. If no new presence is detected in the detection area within five seconds, the power of the application unit 9 is stopped until user presence is again detected in the detection area.

Thus, the present invention enables a control interface to be obtained comprising a rotary control module whose haptic feedback is reconfigurable so as to accommodate a plurality of controls and the coupling to an environmental sensor improves user comfort by adapting the haptic feedback to a parameter of the vehicle and/or to reduce consumption through the use of a proximity sensor that supplies the module only when the user is in proximity or in contact with the grip element 3 of the rotary control.

The invention claimed is:

1. A control interface with haptic feedback for a motor vehicle, configured to take into account an action of a user by providing the user with a haptic feedback, the control interface comprising:
    a magnetorheological fluid module, said magnetorheological fluid module comprising:
        a rotary element comprising a plurality of walls and which rotates about an axis of the magnetorheological fluid module, said rotary element being in contact with a magnetorheological fluid and configured to be coupled to a grip element;
        an application unit for applying a magnetic field to the magnetorheological fluid, and modifying a strength of the magnetic field;
        a processing unit configured to receive a signal emitted by an environmental sensor and to control the application unit for applying a magnetic field according to the signal received; and
        a cavity to receive the magnetorheological fluid, wherein a central wall protrudes from the cavity and is arranged between the plurality of walls of the rotary element,
        wherein the environmental sensor is a torque sensor, and
        wherein the grip element is mounted in a pivoting manner in relation to a ring of the rotary element, and the pivoting of the grip element is blocked by the torque sensor arranged between the grip element and the ring of the rotary element.

2. The control interface as claimed in claim 1, wherein the environmental sensor is a user approach sensor at the grip element.

3. The control interface as claimed in claim 2, wherein the user approach sensor is a contact sensor configured to detect a user's touch on the grip element.

4. The control interface as claimed in claim 3, wherein the contact sensor is a resistive sensor.

5. The control interface as claimed in claim 3, wherein the contact sensor is a capacitive sensor.

6. The control interface as claimed in claim 3, wherein the contact sensor is an optical sensor.

7. The control interface as claimed in claim 3, wherein the control of the application unit for applying a magnetic field corresponds to an absence of application of a magnetic field when the user does not touch the grip element and to the application of a magnetic field when the user touches the grip element.

8. The control interface as claimed in claim 2, wherein the user approach sensor is a contactless sensor.

9. The control interface as claimed in claim 8, wherein the contactless sensor is a capacitive sensor.

10. The control interface as claimed in claim 8, wherein the contactless sensor is an optical sensor.

11. The control interface as claimed in claim 8, wherein the control of the application unit for applying a magnetic field corresponds to an absence of application of a magnetic field when the user is not detected by the contactless approach sensor and the application of a magnetic field when the user is detected by the contactless approach sensor.

12. The control interface as claimed in claim 1, wherein the torque sensor is configured to supply a signal representative of a direction of the rotary element.

13. The control interface as claimed in claim 1, wherein the torque sensor is configured to supply a signal representative of an activation force of the rotary element.

14. The control interface as claimed in claim 1, wherein the torque sensor comprises a strain gauge.

15. The control interface as claimed in claim 1, wherein the environmental sensor is configured to detect a parameter of the motor vehicle.

16. The control interface as claimed in claim 15, wherein the control of the application unit for applying a magnetic field corresponds to the application of a haptic feedback pattern that is predefined as claimed in a value or a state of the motor vehicle's parameter.

17. The control interface as claimed in claim 1, further comprising a position encoder configured to supply a signal representative of an angular position of the rotary element.

18. The control interface as claimed in claim 1, wherein the application unit for applying a magnetic field to the magnetorheological fluid is configured to modify the strength of the magnetic field applied to the magnetorheological fluid according to the rotation of the rotary element about the axis of the magnetorheological fluid module.

\* \* \* \* \*